United States Patent [19]

Starp et al.

[11] Patent Number: 4,514,066
[45] Date of Patent: Apr. 30, 1985

[54] MECHANISM FOR INDICATING AND SETTING THE PARAMETERS OF EXPOSURE APERTURE AND/OR EXPOSURE TIME FOR PHOTOGRAPHIC CAMERAS

[76] Inventors: Franz Starp, Mittlere Steige 36, 7547 Wildbad 5; Werner Deisenroth, Böcklinstrasse 1, 8000 München 19, both of Fed. Rep. of Germany

[21] Appl. No.: 476,311

[22] Filed: Mar. 17, 1983

[30] Foreign Application Priority Data

Mar. 18, 1982 [DE] Fed. Rep. of Germany ....... 3209919

[51] Int. Cl.³ .............................................. G03B 9/02
[52] U.S. Cl. ................................. 354/273; 354/289.1
[58] Field of Search ................. 354/273, 289.11, 289.1

[56] References Cited

U.S. PATENT DOCUMENTS 3,448,673 6/1969 Singer .................................. 354/273
4,372,662 2/1983 Starp et al. .......................... 354/273

FOREIGN PATENT DOCUMENTS 2521628 7/1976 Fed. Rep. of Germany ...... 354/273

*Primary Examiner*—A. A. Mathews

[57] ABSTRACT

Photographic exposure parameter indicating and setting accessory mechanism for a lens shutter housing, e.g. of a professional or studio camera, having a manually operatable exposure parameter setting device, e.g. an exposure time setting device, which in one embodiment contemplates a carrier directly mountable, e.g. removably, in simple manner on the housing, a guide plate mounted, e.g. releasably, on the carrier and a pointer lever pivotally and relatively movably guidedly mounted on the plate and having a pointer for pointing to a setting scale, e.g. time scale, on the plate and a connecting portion for articulated, e.g. removable, connection of the lever to the, e.g. time setting, device, and which in another embodiment further contemplates a slide slidably guided on and movable relative to the carrier and having a setting scale, e.g. diaphragm aperture scale, to which a pointer on the carrier points and a connecting portion for articulated, e.g. removable, connection of the slide to another such device, e.g. an exposure diaphragm aperture setting device, also provided on the housing, whereby upon mounting the carrier on the housing and connecting the lever connecting portion to one such device, or both the lever and slide connecting portions to both such devices respectively, the setting and indicating of such parameters may be correspondingly accomplished in simplified manner by movement of the lever and/or slide manually by the photographer during preparatory work for taking a photograph.

20 Claims, 4 Drawing Figures

MECHANISM FOR INDICATING AND SETTING THE PARAMETERS OF EXPOSURE APERTURE AND/OR EXPOSURE TIME FOR PHOTOGRAPHIC CAMERAS

BACKGROUND OF THE INVENTION

The present invention relates to a mechanism for indicating and setting the parameters of exposure diaphragm aperture and/or exposure time for photographic cameras, especially professional or studio cameras having a lens shutter arrangement which includes manually operatable setting devices for setting the diaphragm aperture and exposure time.

German Patent Specification No. 2,521,628 discloses a photographic camera accessory for setting and indicating the diaphragm aperture and exposure time values, such accessory being capable of attachment to the lens shutter of a professional or studio camera. In such known arrangement, multi-part intermediate transmissions or mechanisms are used to provide an effective connection between, on the one hand, the components of the accessory apparatus, which components are provided with a corresponding diaphragm aperture or time scale, and, on the other hand, the manually operatable setting devices for setting the exposure diaphragm aperture and exposure time, which setting devices are themselves provided at the lens shutter.

However, the need for such intermediate transmission or mechanisms has caused the overall construction of the known arrangement to be considerably complex, and it has proved complicated to equip a camera with such an apparatus and, where necessary, to dismantle or remove such apparatus therefrom. Furthermore, the provision for such transmissions has affected very adversely the manufacturing costs involved.

SUMMARY OF THE INVENTION

It is among the objects and advantages of the present invention to overcome these shortcomings of the known multi-part intermediate transmission containing apparatus, and also to provide an arrangement of unique type for indicating and setting the parameters of diaphragm aperture and/or exposure time, which is distinguished, in particular, by being constructed of few components and therefore by being economical to produce, while simultaneously providing improved readability of associated scale indicia and reliable operation of associated coacting component parts.

These and other and further objects and advantages of the present invention will become apparent from a study of the within specification and accompanying drawings as noted below.

According to the present invention there is provided a mechanism of coacting component parts for indicating and setting the parameters of exposure diaphragm aperture and/or exposure time for photographic cameras, especially professional or studio cameras, having a lens shutter, i.e. shutter housing or arrangement, which includes manually operatable setting devices for setting the diaphragm and time.

In accordance with one combination embodiment of the present invention, the mechanism of coacting component parts comprises an optionally required first assembly including a normal composite carrier and a coacting graduated sliding scale of diaphragm aperture indicia which is relatively movably guided on the composite carrier and which can be brought into effective connection with the diaphragm setting device of the particular camera shutter being used, and wherein the first assembly is arranged for cooperation with a primarily required second assembly which includes a guide plate, which is connectable to the composite carrier of the first assembly and which is also provided with a graduated curved scale of exposure time or shutter speed indicia, and which further includes an exposure time setting pointer lever which is hingedly connectable at its base end to the time setting device of the particular camera shutter being used, such pointer lever being pivotably and relatively movably guided relative to the guide plate.

This coacting component arrangement enables a combined accessory mechanism or apparatus to be provided which is particularly advantageous in that it is constructed with few components and, in addition, the locking connection between the setting and indicating elements of the two assemblies and the actual diaphragm and time setting devices, which are manually operatable and which are normally present in the camera lens shutters themselves, i.e. in the corresponding lens shutter housing, is simple to effect and to dismantle, i.e. to attach to and detach from the particular camera shutter housing or arrangement with which such mechanism may be exchangeably used.

To adapt to the circular path of motion of the hinged connection between the time setting device on the camera shutter itself and the pointer lever during use of such lever, a further feature of the present invention contemplates that the guide plate of the primarily required second assembly is provided with a guide slot in which a bearing pin is slidingly guided, such bearing pin serving for the rotational movement and sliding guidance of the pointer lever on the guide plate.

To preclude any malfunctions which might occur, for example, during the movement operation, by reason of foreign bodies or objects or dirt, etc. penetrating the guide slot for the pointer lever, the present invention further contemplates that an intermediate enlarged portion is provided on the pointer lever, which covers protectively the guide slot of the guide plate in every movement position of the pointer relative to the guide plate.

The exposure parameter "time" of the primarily required second assembly can be advantageously clearly indicated, set and used in optimum manner when the free end of the pointer lever is provided with a window traversing the curved scale of exposure time indicia on the guide plate and also with a manually operated grip handle.

To enable the photographer to use the instant mechanism for indicating and setting the exposure time from any position, the present invention contemplates that both the front and rear surfaces of the guide plate are provided concordantly with a respective time scale.

In those constructional applications where the optionally required first assembly for indicating and setting the diaphragm aperture parameter is omitted, the present invention alternatively provides that a separate modification or substitute carrier is attachable as a substitute first assembly component to the shutter housing, such a substitute carrier serving for the connection of the primarily required second assembly, which cooperates with the time setting device of the cameras shutter itself, the substitute carrier being provided with the same connecting points as the aforesaid normal composite carrier of the first assembly.

The costs for manufacturing the combined apparatus can be kept within reasonably low limits because the normal composite carrier and the graduated sliding scale of the optionally required first assembly and the guide plate and pointer lever of the second assembly may be readily provided in the form of stamped components, e.g. metal stamped flat plate like components. Even less cost is involved where the substitute carrier is used in place of the first assembly with the second assembly.

It will be appreciated that the optionally required first assembly as an independent mechanism is disclosed and claimed in U.S. Pat. No. 4,372,662, issued Feb. 8, 1983 to Franz Starp and Dieter Rittmann, on the basis of U.S. application Ser. No. 300,970, filed Sept. 10, 1981 and corresponding Fed. Rep. of Germany priority applications Nos. 3034630 of Sept. 13, 1980 and 3101388 of Jan. 17, 1981.

On the other hand, the present invention contemplates the combination of the primarily required second assembly and either the substitute carrier or the optionally required first assembly composed of the normal composite carrier and its coacting sliding scale wherein the normal composite carrier, unlike that in said U.S. Pat. No. 4,372,662, contains cooperating attachment means for the second assembly.

BRIEF DESCRIPTION OF THE DRAWINGS

The present invention will be described further, by way of example, with reference to the accompanying drawings, in which.

DESCRIPTION OF THE PREFERRED EMBODIMENTS

Figure 1:
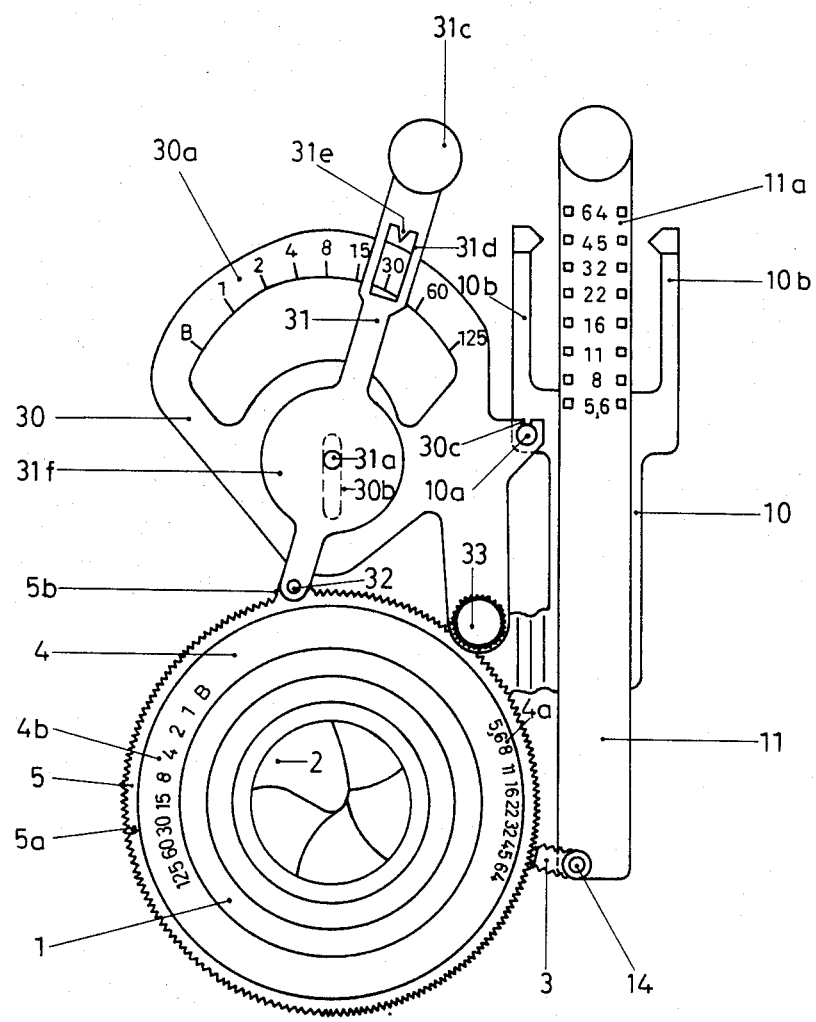
FIG. 1 is a schematic elevational view which illustrates first and second assemblies in accordance with one embodiment of the present invention for indicating and setting the diaphragm aperture and exposure time, said assemblies being connected to the lens shutter or shutter housing of a professional or studio camera.

In the drawings, a lens shutter or shutter housing 1 of the usual type is shown having a segment system or shutter blade system 2, and a manual grip-part 3 for the diaphragm setting ring (not shown in full detail). The front plate 4 of the shutter 1, which is normally constructed with a barrel shaped or cylindrical housing, is provided both with a diaphragm scale 4a and with a time scale 4b. A mark or indicator 5a, directly associated with the time scale 4b, is provided on the front face of a time setting ring 5, which is mounted so as to be rotatable relative to the cylindrical housing of the shutter or shutter arrangement 1.

In the case of professional and studio cameras having means for focussing and setting of the exposure parameters, it is desirable and of technical advantage if the monitoring and setting of the working diaphragm aperture and exposure time parameters can be effected from the back of the camera, i.e. from the actual standing position of the photographer during focal plane viewing.

For this purpose, a manually operatable diaphragm setting device or mechanism, according to one embodiment of the present invention, is provided, which comprises a few stamped components, e.g. two main components, and which can be mounted, as a first assembly, on the outer periphery of the cylindrical housing of the shutter arrangement, e.g. in tangential relation thereto.

The main components of this first assembly are a composite carrier or slide accommodating elongate carrier member 10, which is detachably mountable, e.g. via a curved flange portion or curved plug coupling portion at its lower or base end, on the outer periphery of the cylindrical shutter housing 1 in conventional manner, e.g. by means of screws or a plug coupling (not shown), and an adjusting or setting slide 11, one end, i.e. the base end, of the adjusting slide 11 being connectable, in an articulated manner, directly to the grip part 3 of the diaphragm setting device of the particular shutter 1.

The adjusting slide 11 is relatively movably guided, e.g., generally longitudinally or vertically, on the carrier 10 in conventional manner by means of a pin and corresponding longitudinal or vertical curved slot connection (not shown), and is provided with a scale 11a which serves to indicate the range of operating diaphragm values or working aperture sizes. In turn, the carrier 10 has stationary pointer means thereon, e.g., in the form of a pair of spaced apart parallel arms 10b at its upper or free end, which arms are associated with the adjusting slide 11, i.e. on both sides thereof, the upper or free ends of said arms 10b being designed as pointers which inwardly point toward the diaphragm scale 11a.

For connective operation, or correspondingly to provide the desired connection between the first assembly for indicating and setting the diaphragm value and the actual diaphragm setting device of the lens shutter or arrangement 1, it is important that a hinged or articulated locking connection is achieved between the grip part 3 of the diaphragm setting ring (not shown, as aforesaid) and the adjusting slide 11, for the appropriate operative attachment of the apparatus, irrespective of whether the composite carrier 10 is attached, e.g., removably, to the shutter housing by means of securing screws or by means of a plug coupling.

Figure 3:
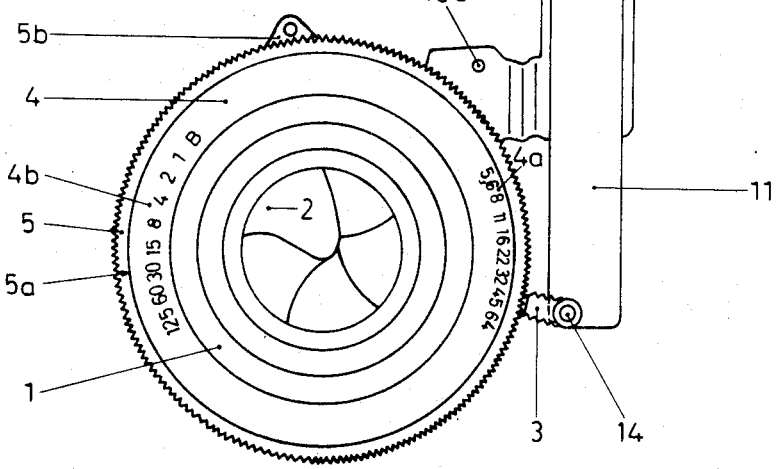
FIG. 3 is a schematic elevational view which illustrates the lens shutter provided with the first assembly for indicating and setting the exposure aperture parameter of the diaphragm as shown in FIG. 1 but with the second assembly being removed.

For achieving this connection, the camera shutter grip part 3 has a bore (cf. FIG. 4) formed therein, and the first assembly slide 11 has a slide connecting portion, e.g. a hinge pin 14 provided at one end of the slide, e.g. at its base end, which is engageable in said bore (cf. FIGS. 1 and 3).

The parts so far described and their mounting arrangement correspond generally to those in the analogous camera shutter housing and carrier and slide arrangement as shown in said U.S. Pat. No. 4,372,662.

In particular, said U.S. Pat. No. 4,372,662 illustrates the cylindrical shutter housing, its diaphragm adjusting ring generally on the rear side or face of the shutter housing and the grip part or drive part operatively connected thereto, the carrier and its curved slot for guidingly engaging the pin of the slide, and alternatively the curved flange portion at the lower or base end of the carrier mounted via screws onto the outer periphery of the cylindrical shutter housing as well as the curved plug coupling in the form of an outer generally semicircular shell and concentric central pin on such lower or base end of the carrier and cooperating bore containing retaining lug fixedly attached to the shutter housing for snap in type plug in connection of the shell surrounded pin of the carrier therewith.

To extend the advantages arising from using a diaphragm setting apparatus of the above optionally required first assembly type, for setting a lens shutter for professional and studio cameras, also to the operating procedure for setting the exposure time, a manually operatable time setting mechanism or primarily required second assembly is correspondingly provided, which according to one embodiment of the present invention is capable of being associated with the above-described first assembly.

Such second assembly also comprises only a few components, e.g. two main components, which are simple to manufacture, namely a guide plate 30, which is provided with a graduated curved scale 30a which serves to indicate the range of operating exposure time values or shutter speeds, a correspondingly longitudinal or vertical guide slot 30b, and a setting lever 31 having a pointer portion which also functions as a pointer.

The setting lever or pointer lever 31, which is relatively displaceably and rotationally guided, generally intermediate its ends, in the slot 30b by means of a hinge and guide pin or bearing pin 31a, is pivotally or articulatedly connected at one end, i.e. the base end, directly to an eyelet 5b, by means of a lever connecting portion thereat, e.g. in the form of a mounting and plug-in pin 32, the eyelet 5b being provided, e.g. fixedly or integrally, on the periphery of the exposure setting ring 5 of the shutter housing 1.

The pointer lever 31 is provided at its other end, i.e. its free end, with a manual gripping handle 31c.

In addition, a central window 31d is provided in the region of the pointer portion of the pointer lever 31 which is arranged in registry with and which sweeps across the graduated curved scale 30a during pivotal movement of the lever. The window 31d in particular has a setting mark or pointer 31e, i.e. along an internal edge portion thereof, which forms the pointer portion and which permits the photographer to see clearly the set value of the exposure time scale 30a both from a position in front of and behind the camera.

In this regard, the front and rear surfaces of the guide plate 30 provide scale accommodating means for accommodating a corresponding curved scale 30a on each such surface in concordant operative registry with the pointer portion or mark 31e of the lever 31.

An enlarged portion or surface extension 31f, preferably having a circular shape, is provided on the pointer lever 31, generally intermediate its ends, so as to be concentric with the hinge and guide pin 31a. In such case, the surface extension 31f is so selected that the guide slot 30b of the guide plate 30 remains protectively covered in every set position or position of movement of the pointer lever 31.

By adapting the arcuate shape of the graduated curved scale 30a to the path of motion which the window 31d of the pointer lever 31 describes during setting of the exposure time via the setting lever 31, the mark 31e maintains a constant radial distance over the entire range of the scale 30a.

To be able to connect the above-described primarily required second assembly for indicating and setting the exposure time value to the optionally required first assembly 10, 11, which is capable of being associated with the diaphragm mechanism, in a simple and rapid yet readily releasable fixed or stationary manner, a slot-like recess 30c is formed advantageously in the guide plate 30, and the composite carrier 10 is provided with cooperating attachment means therefor such as a mounting and retaining pin 10a, which engages this guide plate recess 30c, and also a threaded bore 10c (FIG. 3), which serves to receive a connecting screw 33 operatively secured to the guide plate 30.

Figure 2:
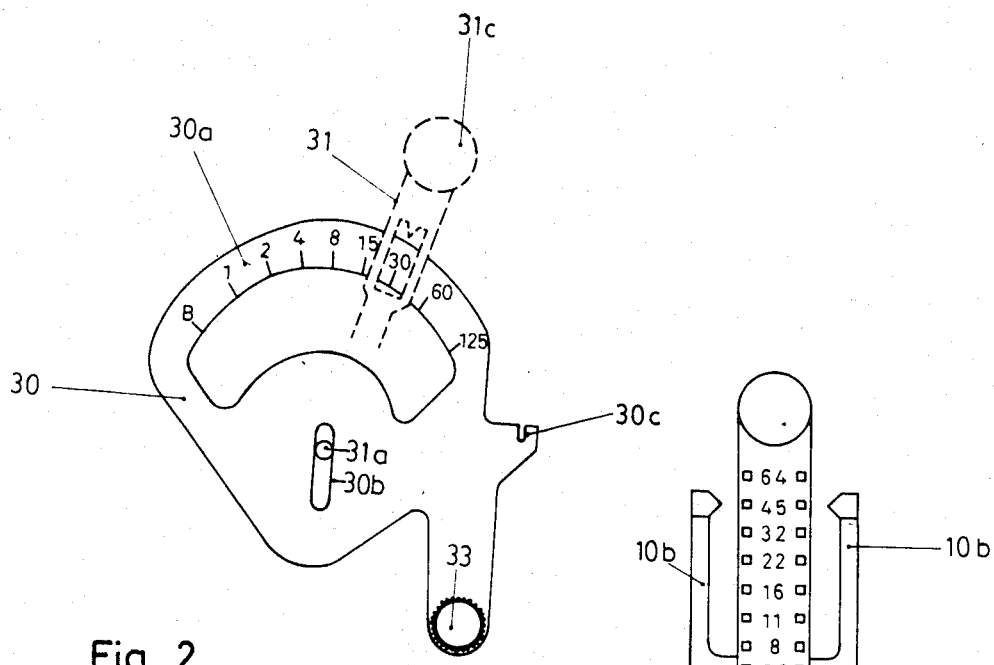
FIG. 2 is a schematic elevational view of the guide plate of the second assembly of FIG. 1, the pointer lever thereof being indicated in phantom to clarify the guide slot in the plate.

Hence, the composite carrier 10 contains specific cooperating attachment means thereon, e.g. at two linearly spaced fixed points as represented by pin 10a and bore 10c as shown in FIG. 3, for attaching removably stationarily or fixedly the guide plate 30 thereon, e.g. via recess 30c and screw 33 as shown in FIG. 2, such that the composite carrier 10 is different from the carrier of the analogous arrangement in said U.S. Pat. No. 4,372,662.

It will be realized that the above-described additional or primarily required second assembly for indicating and setting the exposure time is not restricted to being combined with the diaphragm setting and indicating apparatus or first assembly as illustrated in FIGS. 1 and 3 of the drawing.

Instead, it may also be used with a differently constructed first assembly, in accordance with an alternative embodiment of the present invention, and may in fact even be used alone, i.e. without the first assembly, as a separate assembly on a lens shutter, e.g. for only indicating and setting the exposure time. However, the pre-requisite therefor is always that there are corresponding connecting points for the second assembly, i.e. corresponding to pin 10a and bore 10c on the first assembly 10, 11.

Figure 4:
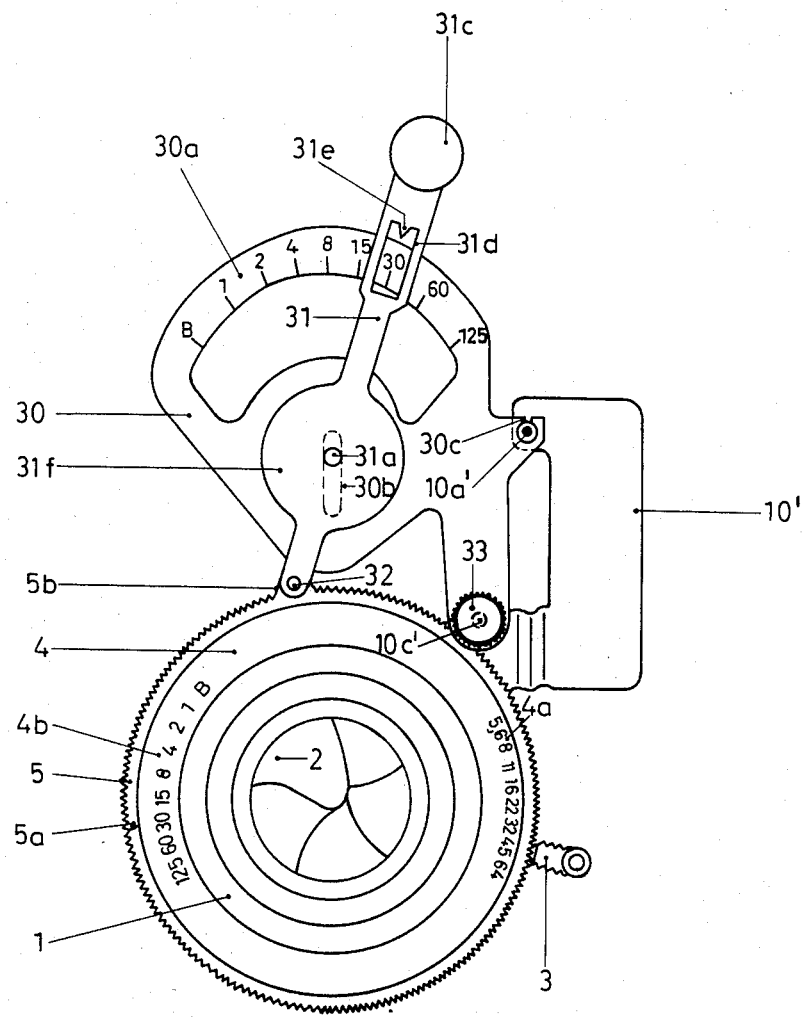
FIG. 4 is a schematic elevation view which illustrates the separate attachment of the second assembly for indicating and setting the exposure time parameter of the lens shutter in accordance with an alternative embodiment of the present invention.

Hence, if there is no first assembly, corresponding support elements are provided in conventional manner on the housing of the lens shutter or arrangement itself as a means for mounting a modification or substitute carrier or carrier plate 10' which is provided with corresponding connecting points, i.e. corresponding to pin 10a and bore 10c, as illustrated in FIG. 4, and which, except for the omission of the two arms 10b and its curved slot (not shown) for guidingly engaging the pin (not shown) of the also omitted slide 11, is of corresponding construction to carrier 10 as shown in FIG. 3.

As illustrated in FIG. 1, however, combining the first assembly with the second assembly may be regarded as being particularly advantageous because the components of both assemblies can be manufactured as stamped components and, as such, can be manufactured economically for conjoint use. In addition, in the contemplated arrangement, the components can also be detachably connected to the lens shutter 1 in a particularly simple manner.

More specifically, this detachable connection can be attained by means of screws or a plug coupling (not shown) for mounting the carrier 10 or carrier 10' to the external periphery of the shutter housing 1, and in turn by means of the grip part 3 for mounting the slide 11 where present via its hinge pin 14, and separately by means of the eyelet 5b for mounting the setting lever 31, with the other elements of the first and second assemblies being concordantly operatively interconnected to each other, e.g. by the cooperating guide plate slot-like recess 30c and carrier pin 10a plus the cooperating guide plate screw 33 and carrier bore 10c where the carrier 10 is present, or where the carrier 10 and slide 11 are omitted, instead by the cooperating guide plate slot-like recess 30c and substitute carrier pin 10a of the carrier 10' plus the cooperating guide plate screw 33 and substitute carrier bore 10c of the carrier 10', as earlier described.

It will be realized that the screw 33 is appropriately dimensioned and positioned on the guide plate 30 so as to clear and thus avoid interference with the free rotational movement of the time setting ring 5 when the pointer lever 31 is moved via handle 31c to displace such ring 5 through the articulated connection of plus in pin 32 and eyelet 5b.

Similarly, the guide plate 30 is mounted on the carrier 10 such that the guide plate 30, and in turn inherently also its pointer lever 31, are remote operatively from the slide 11 in any position of movement of the slide 11, e.g. due to the laterally offset location of the pin 10a and the bore 10c with respect to the movement path of the slide 11 relative to the carrier 10.

In any case, the normal carrier or elongate carrier member 10 and the substitute carrier or carrier plate 10' each constitutes an appropriate carrier means adapted to be mounted, e.g. in the above-described manner, on the lens shutter housing 1 and arranged for mounting and carrying thereon the guide plate 30 on which the pointer lever 31 is operatively mounted.

Broadly, therefore, a photographic exposure parameter indicating and setting mechanism is provided according to the present invention, which is advantageously usable as an accessory apparatus or device for a photographic camera lens shutter housing or arrangement having a manually operatable exposure parameter setting device, e.g. setting ring, thereon.

The mechanism basically comprises carrier means, e.g. carrier 10 or 10', adapted to be mounted on such lens shutter housing or arrangement, a guide plate mounted on and carried by the carrier means and having a photographic exposure parameter setting plate scale, e.g. curved scale 30a, operatively arranged thereon, and a cooperating pointer lever 31 pivotally and relatively movably guidedly mounted on the guide plate and having a pointer portion, e.g. setting mark or pointer 31e, arranged for pointing to the scale in any position of movement of the lever relative to the guide plate along the extent of the scale and a lever connecting portion, e.g. plug in pin 32, adapted to be articulatedly connected to the manually operatable exposure parameter setting device, e.g. time setting ring 5, of the lens shutter housing or arrangement, whereby upon mounting the carrier means on the lens shutter housing or arrangement, e.g. as shown and described in said U.S. Pat. No. 4,372,662, and articulatedly connecting the lever connecting portion to the manually operatable exposure parameter setting device thereof, e.g. via eyelet 5b of time setting ring 5, the exposure parameter may be set and indicated by movement of the lever relative to the guide plate.

More specifically, the guide plate may have a guide slot and the lever may have a cooperating bearing pin slidably guided in the slot for pivotally and relatively movably guidedly mounting the lever on the guide plate. Additionally, the lever may have an enlarged portion arranged for covering protectively the slot of the guide plate in any position of movement of the lever relative to the guide plate.

Preferably, the plate scale is a curved scale and the pointer portion of the lever is provided with a window arranged in registry with the plate scale for viewing the adjacent portion of the scale thereat in any position of movement of the lever relative to the guide plate.

Conveniently, the lever may also have a manual gripping handle for moving the lever relative to the guide plate.

Furthermore, scale accommodating means may be provided on both the front and rear surfaces of the guide plate, e.g. in the curved bridge portion attached to the upper end portion of the guide plate 30 above, and separated by the intermediate open space or aperture from, the enlarged generally circularly shaped main body portion of the guide plate 30 containing the guide slot 30b, for accommodating a corresponding photographic exposure parameter setting plate scale, e.g. curved scale 30a, on each such surface in concordant operative registry with the pointer portion of the lever, i.e. with each such scale being a corresponding mirror image of the other on the opposite surface thereat of the guide plate.

Desirably, the carrier means has a first carrier point attachment means and a second carrier point attachment means at linearly spaced apart concordant first and second carrier location points thereon, e.g. pin 10a and bore 10c at the respective location points thereof on carrier 10, and the corresponding pin and bore first and second carrier point attachment means at the respective location points thereof on carrier 10'.

It each case, the guide plate correspondingly has a cooperating first guide plate point mating attachment means and a cooperating second guide plate point mating attachment means at corresponding linearly spaced apart concordant first and second guide plate mating location points thereon and respectively arranged for releasable mating connection with the first and second carrier attachment means for releasably stationarily mounting the guide plate on the carrier means, e.g. slot-like recess 30c and screw 33 at the respective mating location points thereof on guide plate 30 which are concordantly arranged for releasable mating connection with the pin 10a and bore 10c of carrier 10, or with the corresponding pin and bore of carrier 10', for releasably stationarily mounting the guide plate 30 on carrier 10 or carrier 10' as the case may be.

The carrier means, e.g. carrier 10 or carrier 10', guide plate and lever are advantageously provided in the form of stamped components, e.g. metal plate-like individual unitary components formed from planar or sheet form metal by conventional metal stamping techniques, due to their simple and generally two dimensional constructional nature.

Hence, according to the simplest embodiment, the carrier means may be provided in the form of a unitary attachment plate, e.g. as constituted by substitute carrier 10'.

By way of a board combination arrangement, a photographic camera lens shutter housing or arrangement is provided having a manually operable exposure parameter setting device, and the carrier means is mounted on said housing or arrangement and the lever connecting portion is articulatedly connected to said device.

In particular, the mechanism may be a photographic exposure time parameter indicating and setting mechanism for a photographic camera lens shutter housing having a manually operatable exposure time setting device, the setting plate scale may be an exposure time setting scale, and the lever connecting portion may be adapted to be articulatedly connected to the manually operatable exposure time setting device, whereby upon mounted the carrier means on the lens shutter housing and articulatedly connecting the lever, connecting portion to the manually operatable exposure time setting device thereof, the exposure time may be set and indicated by movement of the lever relative to the guide plate.

By way of a particular time parameter combination arrangement, a photographic camera lens shutter housing is provided having a manually operatable exposure time setting device, and the carrier means is mounted on said housing and the lever connecting portion is articulatedly connected to said device.

Advantageously, the mechanism may be a combination photographic exposure time and exposure diaphragm aperture indicating and setting mechanism for a photographic camera lens shutter housing having both a manually operatable exposure time setting device and a manually operatable exposure diaphragm aperture setting device, and the carrier means may be in the form of a slide accommodating elongate carrier member having a stationary pointer means thereon, e.g. carrier 10 having the pointer containing carrier arms 10b, and wherein a setting slide is provided having a photographic exposure parameter setting slide scale operatively arranged thereon and a slide connection portion, e.g. slide 11 having the slide scale 11a and the hinge pin 14.

Accordingly, the slide in such combination mechanism may be slidably guided on and movable relative to the carrier member, e.g. by the provision for a generally vertically extending curved slot in the carrier member and a cooperating bearing pin on the slide as shown and described in said U.S. Pat. No. 4,372,662, and the stationary pointer means may be arranged for pointing to the slide scale in any position of movement of the slide relative to the carrier member along the extent of the slide scale, and the slide connecting portion may be adapted to be articulatedly connected to one of the manually operatable exposure setting devices of the lens shutter housing, e.g. the diaphragm setting ring as shown and described in said U.S. Pat. No. 4,372,662, and correspondingly the lever connecting portion, e.g. plug in pin 32, of the pointer lever which is mounted on the guide plate may be adapted to be articulatedly connected to the other of the manually operatable exposure setting devices of the lens shutter housing, e.g. time setting ring 5.

Consequently, upon mounting the carrier member on the lens shutter housing, e.g. as shown and described in said U.S. Pat. No. 4,372,662, and articulatedly connecting the slide connection portion to one of the manually operable exposure setting devices thereof, e.g. via grip part 3 of the aforesaid diaphragm setting ring, and correspondingly articulatedly connecting the lever connecting portion to the other of the manually operable exposure setting devices thereof, e.g. via eyelet 5b of time setting ring 5, the exposure time and the exposure diaphragm aperture may be correspondingly set and indicated by corresponding movement of the slide relative to the carrier member and of the lever relative to the guide plate.

By way of a particular time and diaphragm aperture parameter combination arrangement, a photographic camera lens shutter housing is provided having both a manually operatable exposure time setting device and a manually operatable exposure diaphragm aperture setting device, and the carrier member is mounted on said housing and the slide connecting portion is articulatedly connected operatively to one of said devices and the lever connecting portion is correspondingly articulatedly connected operatively to the other of said devices.

Here also, the slide, like the carrier member, e.g. carrier 10, and the guide plate and lever, is advantageously provided in the form of a stamped component as earlier stated, due to its like simple and generally two dimensional constructional nature.

Preferably, the scale of the guide plate is an exposure time setting scale and the scale of the slide is an exposure diaphragm aperture setting scale, and the slide connecting portion is adapted to be articulatedly connected to the manually operatable exposure diaphragm aperture setting device of the lens shutter housing and correspondingly the lever connecting portion is adapted to be articulatedly connected to the manually operatable exposure time setting device of the lens shutter housing.

More specifically, by way of such particular time and diaphragm aperture parameter combination arrangement, a photographic camera lens shutter housing is provided having such a manually operatable exposure time setting device and such a manually operatable exposure diaphragm aperture setting device, and the carrier member is mounted on said housing and the slide connecting portion is articulatedly connected operatively to said diaphragm aperture setting device, e.g. via the grip-part 3, and the lever connecting portion is correspondingly articulatedly connected operatively or directly to said time setting device, e.g. via the eyelet 5b.

Preferably, a photographic exposure parameter indicating and setting composite accessory mechanism is provided according to a basic embodiment of the present invention, which is particularly advantageously usable for a photographic camera lens shutter housing or arrangement having both a manually operatable exposure time setting device and a manually operatable exposure diaphragm aperture setting device thereon, as aforesaid.

The composite mechanism specifically comprises an exposure diaphragm aperture indicating and setting first assembly and an exposure time indicating and setting second assembly, for individual independent or conjoint use by the photographer.

The first assembly includes a slide accommodating elongate carrier member, e.g. carrier 10, adapted to be removably mounted on such lens shutter housing and having a stationary pointer means thereon, and a diaphragm setting slide having a linear exposure diaphragm aperture setting slide scale thereon and a slide connecting portion, the slide being slidably operatively guided on and movable relative to the carrier member and the stationary pointer means being arranged for pointing to the slide scale in any position of movement of the slide relative to the carrier member along the extent of the slide scale, and the slide connecting portion being adapted to be articulatedly connected operatively and removably to the manually operatable exposure diaphragm aperture setting device of the lens shutter housing.

Correspondingly, the second assembly includes a guide plate releasably mounted on and carried by the carrier member in stationary or fixed relation thereon, remote from the slide in any position of movement of the slide, and having a curved exposure time setting plate scale thereon, and a cooperating pointer lever pivotally and relatively movably guidedly mounted operatively on the guide plate and having a pointer portion arranged for pointing to the plate scale in any position of movement of the lever relative to the guide plate along the extent of the plate scale and a lever connecting portion adapted to be articulatedly connected operatively and removably to the manually operatable exposure time setting device of the lens shutter housing.

Consequently, upon mounting the carrier member removably on the lens shutter housing or arrangement and articulatedly connecting operatively and removably the slide connecting portion to the manually operatable exposure diaphragm aperture setting device thereof and correspondingly articulatedly connecting removably the lever connecting portion operatively and removably to the manually operatable exposure time setting device thereof, the exposure diaphragm aperture may be set and indicated by movement of the slide relative to the carrier member and correspondingly the exposure time may be set and indicated by movement of the lever relative to the guide plate.

Preferably, in this composite mechanism basic embodiment, the guide plate has a guide slot and the lens has a cooperating bearing pin slidably guided in the slot for pivotally and relatively movably guidingly mounting operatively the lever on the guide plate. Similarly, the lever preferably has an enlarged portion arranged for covering protectively the slot of the guide plate in any position of movement of the lever relative to the guide plate.

Of course, as before, the slide is mounted on the carrier member, the latter is mounted on the lens shutter housing, and the slide is operatively connected to the diaphragm aperture setting device, all as shown and described in said U.S. Pat. No. 4,372,662.

It will be appreciated that the foregoing specification and accompanying drawings are set forth by way of illustration and not limitation, and that various modifications and changes may be made therein without departing from the spirit and scope of the present invention which is to be limited solely by the scope of the appended claims.

What is claimed is:

1. Photographic exposure parameter indicating and setting mechanism for a photographic camera lens shutter housing having a manually operatable exposure parameter setting device, which comprises carrier means adapted to be mounted on such lens shutter housing, a guide plate mounted on and carried by the carrier means and having a photographic exposure parameter setting plate scale operatively arranged thereon, and a cooperating pointer lever pivotally and relatively movably guidedly mounted on the guide plate and having a pointer portion arranged for pointing to the scale in any position of movement of the lever relative to the guide plate along the extent of the scale and a lever connecting portion adapted to be articulatedly connected to the manually operatable exposure parameter setting device of the lens shutter housing, whereby upon mounting the carrier means on the lens shutter housing and articulatedly connecting the lever connecting portion to the manually operatable exposure parameter setting device thereof, the exposure parameter may be set and indicated by movement of the lever relative to the guide plate.

2. Mechanism of claim 1 wherein the guide plate has a guide slot and the lever has a cooperating bearing pin slidably guided in the slot for pivotally and relatively movably guidedly mounting the lever on the guide plate.

3. Mechanism of claim 2 wherein the lever has an enlarged portion arranged for covering protectively the slot of the guide plate in any position of movement of the lever relative to the guide plate.

4. Mechanism of claim 1 wherein the plate scale is a curved scale and the pointer portion of the lever is provided with a window arranged in registry with the plate scale for viewing the adjacent portion of the scale thereat in any position of movement of the lever relative to the guide plate.

5. Mechanism of claim 1 wherein the lever has a manual gripping handle for moving the lever relative to the guide plate.

6. Mechanism of claim 1 wherein scale accommodating means are provided on both the front and rear surfaces of the guide plate for accommodating a corresponding photographic exposure parameter setting plate scale on each such surface in concordant operative registry with the pointer portion of the lever.

7. Mechanism of claim 1 wherein the carrier means has a first carrier point attachment means and a second carrier point attachment means at linearly spaced apart concordant first and second carrier location points thereon, and the guide plate correspondingly has a cooperating first guide plate point mating attachment means and a cooperating second guide plate point mating attachment means at corresponding linearly spaced apart concordant first and second guide plate mating location points thereon and respectively arranged for releasable mating connection with the first and second carrier attachment means for releasably stationarily mounting the guide plate on the carrier means.

8. Mechanism of claim 1 wherein the carrier means, guide plate and lever are in the form of stamped components.

9. Mechanism of claim 1 where the carrier means is in the form of a unitary attachment plate.

10. Mechanism of claim 1 wherein a photographic camera lens shutter housing is provided having a manually operatable exposure parameter setting device, and the carrier means is mounted on said housing and the lever connecting portion is articulatedly connected to said device.

11. Mechanism of claim 1 wherein the mechanism is a photographic exposure time parameter indicating and setting mechanism for a photographic cameras lens shutter housing having a manually operatable exposure time setting device, the setting plate scale is an exposure time setting scale, and the lever connecting portion is adapted to be articulatedly connected to the manually operatable exposure time setting device, whereby upon mounting the carrier means on the lens shutter housing and articulatedly connecting the lever connecting portion to the manually operatable exposure time setting device thereof, the exposure time may be set and indicated by movement of the lever relative to the guide plate.

12. Mechanism of claim 11 wherein a photographic camera lens shutter housing is provided having a manually operatable exposure time setting device, and the carrier means is mounted on said housing and the lever connecting portion is articulatedly connected to said device.

13. Mechanism of claim 1 wherein the mechanism is a combination photographic exposure time and exposure diaphragm aperture indicating and setting mechanism for a photographic camera lens shutter housing having a manually operatable exposure time setting device and a manually operatable exposure diaphragm aperture setting device, and the carrier means is in the form of a slide accommodating elongate carrier member having a stationary pointer means thereon, and wherein a setting slide is provided having a photographing exposure parameter setting slide scale operatively arranged thereon and a slide connecting portion, the slide being slidably guided on and movable relative to the carrier in any position of movement of the slide relative to the carrier member along the extent of the slide scale, and the slide connecting portion being adapted to be articulatedly connected to one of the manually operatable exposure setting devices of the lens shutter housing and correspondingly the lever connecting portion of the pointer lever which is mounted on the guide plate being adapted to be articulatedly connected to the other of the manually operatable exposure setting devices of the lens shutter housing, whereby upon mounting the carrier member on the lens shutter housing and articulatedly connecting the slide connecting portion to one of the manually operatable exposure setting devices thereof and correspondingly articulatedly connecting the lever connecting portion to the other of the manually operatable exposure setting devices thereof, the exposure time and the exposure diaphragm aperture may be correspondingly set and indicated by corresponding movement of the slide relative to the carrier member and of the lever relative to the guide plate.

14. Mechanism of claim 13 wherein a photographic camera lens shutter housing is provided having a manually operatable exposure time setting device and a manually operatable exposure diaphragm aperture setting device, and the carrier member is mounted on said housing and the slide connecting portion is articulatedly connected operatively to one of said devices and the lever connecting portion is correspondingly articulatedly connected operatively to the other of said devices.

15. Mechanism of claim 13 wherein the carrier member, slide, guide plate and lever are in the form of stamped components.

16. Mechanism of claim 13 wherein the scale of the guide plate is an exposure time setting scale and the scale of the slide is an exposure diaphragm aperture setting scale, and the slide connecting portion is adapted to be articulatedly connected to the manually operatable exposure diaphragm aperture setting device of the lens shutter housing and correspondingly the lever connecting portion is adapted to be articulatedly connected to the manually operatable exposure time setting device of the lens shutter housing.

17. Mechanism of claim 16 wherein a photographic camera lens shutter housing is provided having a manually operatable exposure time setting device and a manually operatable exposure diaphragm aperture setting device, and the carrier member is mounted on said housing and the slide connecting portion is articulatedly connected operatively to said diaphragm aperture setting device and the lever connecting portion is correspondingly articulatedly connected operatively to said time setting device.

18. Photographic exposure parameter indicating and setting composite accessory mechanism for a photographic camera lens shutter housing having a manually operatable exposure time setting device and a manually operatable exposure diaphragm aperture setting device, which comprises an exposure diaphragm aperture indicating and setting first assembly including a slide accommodating elongate carrier member adapted to be removably mounted on such lens shutter housing and having a stationary pointer means thereon, and a diaphragm setting slide having a linear exposure diaphragm aperture setting slide scale thereon and a slide connecting portion, the slide being slidably guided on and movable relative to the carrier member and the stationary pointer means being arranged for pointing to the slide scale in any position of movement of the slide relative to the carrier member along the extent of the slide scale, and the slide connecting portion being adapted to be articulatedly connected operatively to the manually operatable exposure diaphragm aperture setting device of the lens shutter housing, and an exposure time indicating and setting second assembly including a guide plate releasably mounted on and carried by the carrier member, remote from the slide in any position of movement of the slide, and having a curved exposure time setting plate scale thereon, and a cooperating pointer lever pivotally and relatively movably guidedly mounted on the guide plate and having a pointer portion arranged for pointing to the plate scale in any position of movement of the lever relative to the guide plate along the extent of the plate scale and a lever connecting portion adapted to be articulatedly connected to the manually operatable exposure time setting device of the lens shutter housing, whereby upon mounting the carrier member on the lens shutter housing and articulatedly connecting the slide connecting portion to the manually operatable exposure diaphragm aperture setting device thereof and correspondingly articulatedly connecting the lever connecting portion to the manually operatable exposure time setting device thereof, the exposure diaphragm aperture may be set and indicated by movement of the slide relative to the carrier member and correspondingly the exposure time may be set and indicated by movement of the lever relative to the guide plate.

19. Mechanism of claim 18 wherein the guide plate has a guide slot and the lever has a cooperating bearing pin slidably guided in the slot for pivotally and relatively movably guidingly mounting the lever on the guide plate.

20. Mechanism of claim 19 wherein the lever has an enlarged portion arranged for covering protectively the slot of the guide plate in any position of movement of the lever relative to the guide plate.

* * * * *